United States Patent Office 3,513,114
Patented May 19, 1970

---

3,513,114
INTUMESCENT COATING COMPOSITIONS
Frank J. Hahn, Wilbraham, Mass., and Howard L. Vandersall, Ballwin, Mo., assignors to Monsanto Company, St. Louis, Mo., a corporation of Delaware
No Drawing. Filed Jan. 7, 1966, Ser. No. 519,289
Int. Cl. C09d 5/18; C09k 3/28; C08d 11/02
U.S. Cl. 260—8                    10 Claims

ABSTRACT OF THE DISCLOSURE

Intumescent coating compositions are disclosed which comprise an aqueous dispersion of a polyvinyl acetate-containing emulsion, a solvent plasticizer, a carbonific and substantially water-insoluble ammonium polyphosphates having a phosphorus chain length greater than 10 phosphorus atoms.

---

The present invention relates to intumescent coating compositions exhibiting improved wet abrasion resistant properties. More particularly, this invention relates to intumescent coating compositions which exhibit superior intumescent properties after being repeatedly washed and/or scrubbed.

Intumescent coating compositions, that is, coating compositions containing, in addition to a film forming latex binder, other additives including intumescent solids of a phosphate containing material and a carbonific or carbon-yielding material which intumesce when heat or fire is applied thereto are well known in the art. However, the prior art intumescent coating compositions, being formulated with many additives, exhibit the distinct disadvantage of either or both failing to maintain a coating film which will withstand repeated scrubbing or washing and thus exhibit wet abrasion resistant properties and/or failing to perform properly their intended function, that is, to intumesce, and thus fire retard after repeated scrubbing or washing. For example, if relatively water soluble phosphate and/or carbonific additives are used, such tend to leach out of the film during scrubbing or washing and thus render the surface coating substantially ineffective in intumescent properties. Replacing such relatively water soluble additives with relatively water insoluble additives does not, in general, achieve the expected increase in wet abrasion resistant propreties. As can be appreciated, therefore, formulating tough wet abrasion resistant surface coatings which contain additives for intumescing is a highly complex problem which has not been heretofore successfully solved.

It is therefore an object of the present invention to provide an intumescent coating composition which exhibits improved wet abrasion resistant properties.

It is another object of this invention to provide an intumescent coating composition which exhibits improved intumescent properties after being repeatedly washed and/or scrubbed.

The above as well as other objects of this invention will become apparent from the following detailed description.

In general, intumescent coating compositions of the present invention comprise an aqueous dispersion of (A) polyvinyl acetate-containing emulsion as a binder or film forming latex, (B) a solvent plasticizer, (C) a phosphate material, and (D) a carbonific or carbon-yielding material; with the foregoing comprising from about 30% to about 90% by weight of the total composition.

The polyvinyl acetate-containing emulsion suitable for incorporation into the intumescent coating composition is usually of about 40% to about 70% solids and is, in general, used in amounts to provide from about 5% to about 40%, preferably from about 10% to about 30%, of latex solids based on the total weight of the solids present in the intumescent coating composition. This emulsion may contain either polymers of vinyl acetate or copolymers of vinyl acetate and other polymeric materials such as acrylate, aliphatic esters of maleic or fumaric acid (dibutyl maleate, diethyl maleate, di-2-ethyl hexyl maleate and the like), and ethylene with polyvinyl acetate and copolymers of vinyl acetate and acrylate being preferred. As is known in the art minor amounts (usually less than about 2% based on the weight of latex solids) of additive type plasticizers (which remain in the coating film after drying the composition) such as phthalic esters (dibutyl phthalate) can be used in the present invention.

The fugitive or solvent plasticizer suitable for incorporation into the intumescent coating composition is of the alkoxy glycol ether and/or alkoxy acetate type and is, in general, used in amounts to provide from about 0.1% to about 10%, preferably from about 1% to about 3%, based on the weight of latex solids present in the intumescent coating composition.

The use of a solvent type plasticizer is important since such tends to impart the necessary coalescence to the polymer particles yet volatilizes during the drying period of the coating, thus does not remain in the coating to either increase the tendency to be leached or abraded from the coating or interfere with the intumescent properties of the coating.

In particular, the alkoxy glycol ethers which are suitable are the etherifield glycols which contain from about 6 to about 10 carbon atoms and can be either partially or totally etherifield. In addition, the glycols may be partially etherified and partially esterified by the substitution of an acetate group for one of the hydroxy groups. Examples of the foregoing include diethylene glycol monoethyl ether, diethylene glycol diethyl ether, ethylene glycol monoethyl ether acetate, diethylene glycol monoethyl ether acetate, diethylene glycol monobutyl ether, 2-methoxy methyl-2,4-dimethyl pentanediol 1,5 and 2-ethoxymethyl 2,4-dimethyl pentanediol,1,5 and the like. Further, alkoxy acetates which are suitable are ether chains having from about 4 to about 8 carbon atoms and are esterified by acetic acid. For example, the acetate ester of ethylene glycol monoethyl ether and the acetate ester of ethylene glycol monobutyl ether as well as the monoesters of acetic acid comprising polyether chains containing from about 4 to about 8 carbon atoms such as the monomethyl monoethyl and monobutyl ether of diethylene glycol monoacetate are representative of some of the specific compounds which are suitable for use as solvent plasticizers in the intumescent coating compositions of the present invention. Additionally, mixtures of all of the foregoing can be used.

The phosphate containing materials useful in the present invention are the substantially water-insoluble ammonium polyphosphates, i.e., those compounds having P—O—P linkages, and having the general formula

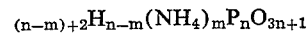

$$(n-m)+2H_{n-m}(NH_4)_mP_nO_{3n+1}$$

wherein $n$ is an integer having an average value greater than 10 and $m/n$ is between about 0.7 and about 1.1 and the maximum value of $m$ is equal to $n+2$. The average value of $n$ being greater than 10 is evidenced by the paper chromatography method [Karl-Kroupa, Anal. Chem., 28, 1091 (1956)], and the polymeric P—O—P type linkage is evidenced by n.m.r. spectra which indicates substantially no P—N—P type linkages and no ortho, pyro or short chain P—O—P type groups and by infra-red spectra which indicates P—O—P type linkages but does not indicate substantially any P—N type linkages.

These polymeric polyphosphates can be either straight chain structures or branched chain structures. It should be noted that substantially all of the nitrogen in these polyphosphates is present as the ammoniacal nitrogen and there is substantially no nuclear nitrogen present in the polyphosphates. Although theoretically the ammoniacal nitrogen to phosphorus molar ratio for the polyphosphates of the instant invention is about 1, i.e., $$\frac{m+2}{n}$$

with $m=n$, when the polyphosphates are completely ammoniated, in some cases the molar ratio of ammoniacal nitrogen to phosphorus is less than 1 and it is intended that this invention pertains to those polymeric ammonium polyphosphates having a molar ratio of not less than about 0.7. In addition, when the polyphosphates of the instant invention are characterized herein as being substantially water-insoluble it is intended to mean that the solubility of a slurry of 10 grams of solids/100 cc. of water for 60 minutes at 25° C. is about 5 grams/100 cc. of water or less. Specifically, for purposes of the present invention an ammonium polyphosphate having a solubility of a specified value refers to the solubility value in grams per 100 cc. of water when 10 grams of said polyphosphate are slurried in 100 cc. of water for 60 minutes at 25° C.

The degree of polymerization of the substantially water-insoluble ammonium polyphosphates is difficult to determine since known methods for determining such are "so-called" solution methods, that is, they employ solution techniques for polymerization measurements. For example, as determined by the end group titration method [Van Wazer, Griffith and McCullough, Anal. Chem., 26, 1755 (1954)] after converting the ammonium polyphosphate to the acid form by ion exchange resins [Van Wazer and Holst, J. Am. Chem. Soc., 72, 639 (1950)], the average numerical value of $n$ is from about 20 to about 400, preferred from about 40 to about 400; whereas, as determined by the method of light scattering or viscosity correlations obtained from light scattering [Strauss and Wineman, J. Am. Chem. Soc., 80, 2366 (1958)] modified by use of the Zimm plot method [Stacey, "Light-Scattering in Physical Chemistry," Butterworths, London (1956)] the weight average value of $n$ is above about 500 and preferred from about 500 to about 100,000 with from about 1,000 to about 30,000 being being especially preferred.

The term "ammoniacal nitrogen" refers to that nitrogen which is present in the form of ammonium ions and is capable of being removed by the hydrogen form of a strong cation exchange resin, i.e., the hydrogen form of a sulfonate polystyrene resin. The term "non-ammoniacal nitrogen" or "nuclear nitrogen" refers to nitrogen incapable of being removed in the manner of true ammonium nitrogen.

The ammonium polyphosphates can be prepared exhibiting many different crystalline forms as evidenced by their X-ray diffraction patterns and, in general, any of such forms can be used (although Forms 1 and 2, infra, are preferred) as well as the non-crystalline or amorphous form. Crystalline forms illustrative of some of the ammonium polyphosphates suitable for use include the following:

X-RAY DIFFRACTION DATA [a]

| Form 1 | | Form 2 | | Form 3 | | Form 4 | |
|---|---|---|---|---|---|---|---|
| Line [b] | $d$, A. | Line [b] | $d$, A. | Line [b] | $d$, A. | Line [b] | $d$, A. |
| 1 | 6.06 | 1 | 5.70 | 1 | 6.65 | 1 | 5.70 |
| 2 | 5.47 | 2 | 6.06 | 2 | 5.68 | 2 | 5.60 |
| 3 | 3.83 | 3 | 3.08 | 3 | 5.40 | 3 | 3.42 |
| 4 | 3.50 | 4 | 2.93 | 4 | 3.52 | 4 | 7.00 |
| 5 | 3.24 | 5 | 3.37 | 5 | 3.80 | 5 | 6.10 |

[a] CuK $\alpha$ radiation.
[b] Five strongest lines in order of decreasing intensity.

In general, the ammonium polyphosphates can be used in any size which permits their admixture with the other components of the intumescent coating composition into a homogeneous mixture. In particular, ammonium polyphosphates having a particle size fine enough to pass through an 80 mesh screen (USSS) are preferred, with a particle size at least fine enough to pass through a 200 mesh screen being especially preferred.

The substantially water-insoluble ammonium polyphosphates of the present invention can be prepared by many and various methods such as the methods disclosed and described in co-pending application Ser. No. 420,459, filed Dec. 22, 1964. In general, a phosphate containing material, such as monoammonium orthophosphate, diammonium orthophosphate, condensed phosphoric acid, orthophosphoric acid and the like, is thermally condensed with an ammoniating and condensing agent such as urea, ammonium carbonate, biuret, sulfamide, sulfamic acid, ammonium sulfamate, guanyl urea, methyl urea formamide amino urea, 1-3-diamino urea, biurea and the like. In particular, for example, monoammonium orthophosphate and urea can be thermally condensed to prepare substantially water-insoluble ammonium polyphosphates by heat treating a melt formed from substantially equimolar quantities at a temperature of about 250° C. for a period of about 3 hours.

In general, the ammonium polyphosphates can be employed in the intumescent coating in amounts to provide from about 1% to about 60% based on the total weight of solids with amounts of from about 12% to about 30% by weight being preferred.

The carbonifics, which are employed in amounts to provide from about 1% to about 40%, preferably from about 10% to about 30%, based on the total weight of solids, may in general, be either an admixture or pre-formed products of resinous carbonifics such as urea and a source of formaldehyde such as paraformaldehyde, or urea-formaldehyde resins or melamine-formaldehyde resins. In addition, non-resinous carbonifics may be used solely or in conjunction with the resinous carbonifics and which include carbohydrated, modified starches, and similar substances, a water-dispersible protein and a gelatin or casein or a polyhydric compound such as hexitols (mannitol), penitols (arabitol, monopentaerythritol, the poly-pentaerythritols, that is, polymeric forms, for example, as a dimer, trimer and the like, such as dipentaerythritol and tripentaerythritol and mixture thereof, and solid chlorinated paraffin materials containing from about 40 to about 70% by weight of chlorine. In addition, improved results can oftentimes be obtained from adding to the non-resinous carbonific an amine compound such as dicyandiamide, urea, melamine, dimethyl urea, glycerine and the like with dicyandiamide and melamine being preferred. Usually amounts of such amine compounds of from about 5% to about 75% based on the total weight of carbonific solids are preferred. It is possible to use a mixture of two or more of the above-mentioned compounds. It is preferred that the carbonific component contain at least some of the chlorinated paraffin which not only tends to act to produce a carbon yielding substance but also tends to produce foam.

It is preferred that the following list of carbonifics be employed in the amounts as indicated:

| Carbonific: | Amount (Percent of total weight of carbonific solids) |
|---|---|
| Urea-formaldehyde or melamine-formaldehyde | 0 to 20 |
| Dipentaerythritol or tripentaerythritol | 5 to 30 |
| Chlorinated paraffins | 10 to 50 |
| Dicyandiamide or melamine | 10 to 50 |

In addition, various other additives may be incorporated into the composition such as dyes, pigments, swelling agents, wetting agents, dispersing agent, fungicides or bactericides and the like. In general, these additives are, if used, employed in minor amounts usually less than about 15% by weight of the total weight of the composition.

Although there are many and various methods for preparing the intumescent compositions of the present invention, one such method entails adding water and the components to be incorporated into the composition other than the polyvinyl acetatecontaining emulsion and mixing and grinding such together, such as in a pebble mill, for varying lengths of time dependent on the ingredients used and the desired paint properties, such as sheen, smoothness and the like, but usually between about 15 minutes to about 5 hours are sufficient, and then the polyvinyl acetate-containing emulsion is introduced into the composition under agitation and mixed, usually for about 15 to about 30 minutes.

An example of a preferred composition falling within the scope of the present invention is as follows:

EXAMPLE I

| Additive: | Parts by weight |
|---|---|
| Water | 24.54 |
| Potassium tripolyphosphate | 0.96 |
| Wetting agents | 0.46 |
| Solvent plasticizer | varied as indicated |
| Melamine-formaldehyde resin | 1.92 |
| Melamine | 7.66 |
| Tri-pentaerythritol | 3.83 |
| Ammonium polyphosphate | 22.94 |
| Titanium dioxide | 7.66 |
| Chlorinated paraffins (about 70% by weight chlorine) | 4.59 |
| Carboxymethylcellulose (2% solution) | 2.19 |
| Water | 4.41 |
| Dibutyl phthalate | 0.92 |
| Polyvinyl acetate emulsion (about 60% solids) | 15.76 |
| Anti-foam agent | 0.20 |

Note:
(1) Wetting agents—0.8 parts dihexysulfosuccinic acid (sodium salt), 0.38 parts of diethanolamine and linoleic acid condensate.
(2) Solvent plasticizer—diethylene glycol monoethyl ether acetate.
(3) Melamine-formaldehyde resin—"Resimine" 821—a trademark name for a melamine formaldehyde resin sold by Monsanto Company.
(4) Ammonium polyphosphate—phosphorus, percent by weight—32, solubility—1.0, ammoniacal nitrogen to phosphorus molar ratio—~.92, crystalline Form 1.
(5) Polyvinyl acetate emulsion—"Resyn" 1066—a trademark name for a polyvinyl acetate emulsion sold by National Starch and Chemical Company.
(6) Antifoam agent—"SAG" 470—a trademark name for a silicon anti-foam agent sold by Union Carbide Company.

For the above formulation, all of the above additives were stirred into a vessel filled half full of 8 mm. glass beads in the above listed order through the amonium polyphosphate and then mixed on a paint shaker for about 15 minutes. The titanium dioxide, chlorinated paraffins, carboxymethylcellulose and water were added and then mixed on a paint shaker for about 10 minutes. Dibutyl phthalate was added and the composition mixed for about 5 minutes and then the remaining ingredients were added and mixed on a paint shaker for about 2 minutes after which the glass beads were removed from the composition by screening.

The above composition as well as compositions containing the same additives except using as the phosphate material guanyl-urea phosphate and monoammonium orthophosphate (in amounts to give the same phosphorus content as ammonium polyphosphate in the composition) as well as using no solvent plasticizer and 2% by weight of the total composition of the solvent plasticizer were tested for their performance as a fire-retardant intumescent type coating both before and after scrubbing. Since guanylurea phosphate is an amine compound no melamine was used with guanylurea phosphate in the foregoing composition.

The fire retardant test is similar to that prescribed in ASTM E–84–50T except that a 2-foot tunnel was used instead of a 25-foot tunnel. The results using this tunnel, however, correlate very well with the results using the 25-foot tunnel. In this test a 2-foot Grade A red oak panel, 1-inch thick, which has been pre-conditioned at 77° F. and 50% R.H. is used as a standard with 100 being determined by the maximum distance the flame reaches on the panel in 4 minutes. In addition, an asbestos-cement panel of the same dimensions is used as 0 reference under the same conditions as set forth for the red oak panel. The flame rating is the distance the flame travels in 4 minutes expressed as a percentage between the reference 0 used and the reference 100 used. The coating composition is applied to a panel (1¼ x 4 x 24 inches) of yellow poplar heartwood in each instance with a coverage of about 150 ft.²/gal. A flame rating less than 25 on the ASTM E–84–50T test is necessary for a class A rating.

The scrub resistance test was performed on the coated panels using the "Gardiner Straight Line Scrub Tester"—Model 105 (obtained from Gardiner Laboratories, Inc., Bethesda, Md.) with a 5% "Ivory Snow" solution as the scrubbing media and a sponge weighted to 1 pound as the scrub utensil. The number of scrub cycles are reported although each cycle represents 2 strokes.

The following table sets forth the results of the tests:

TABLE

| Phosphate material | Solvent plasticizer percent by weight | Cycles scrubbed | Flame rating | Percent film removed |
|---|---|---|---|---|
| 1. Guanylurea phosphate | 0 | 0 | 26 | |
| | 0 | 1,000 | 155 | >95 |
| | 2 | 0 | 22 | |
| | 2 | 1,000 | 166 | >95 |
| 2. Monoammonium orthophosphate | 0 | 0 | 22 | |
| | 0 | 1,000 | 140 | >95 |
| | 2 | 0 | 14 | |
| | 2 | 1,000 | 140 | 47.7 |
| 3. Ammonium polyphosphate | 0 | 0 | 22 | |
| | 0 | 1,000 | 78 | 64 |
| | 1 | 0 | 27 | |
| | 1 | 1,000 | 20 | 32 |
| | 2 | 0 | 27 | |
| | 2 | 1,000 | 24 | 5 |

As can be observed from the above table, the intumescent coating composition of the present invention (those containing ammonium polyphosphate and a solvent plasticizer) achieved class A fire ratings both before and after scrubbing (1000 cycles) while those containing other conventionally used phosphate materials (guanylurea phosphate and monoammonium orthophosphate) with solvent plasticizers did not achieve a class A fire rating after scrubbing (1000 cycles); in fact, such coatings had essentially been destroyed after 1000 cycles of scrubbing. This dramatically illustrates the superior intumescent properties of the intumescent coating composition of the present invention after being repeatedly washed and scrubbed and as far as can be determined represents for the first time an aqueous dispersed intumescent coating composition containing as a binder polyvinyl acetate which achieved a class A fire rating after being scrubbed for 1000 cycles.

Other examples of compositions according to the present invention are as follows:

EXAMPLE II

| Additive: | Parts by weight |
|---|---|
| Water | 24.54 |
| Potassium tripolyphosphate | 0.96 |
| Wetting agents | 0.46 |
| Solvent plasticizer | 2.0 |
| Melamine-formaldehyde resin | 1.92 |
| Melamine | 7.66 |
| Tri-pentaerythritol | 3.83 |
| Ammonium polyphosphate | 22.94 |
| Titanium dioxide | 7.66 |
| Chlorinated paraffins (about 70% by weight chlorine) | 4.59 |
| Carboxymethylcellulose (2% solution) | 2.19 |
| Water | 4.41 |
| Dibutyl phthalate | 0.92 |
| Polyvinyl acetate emulsion (about 60% solids) | 15.76 |
| Antifoam agent | 0.20 |

*Note:*

(1) Wetting agents—same as Example 1.
(2) Solvent plasticizer—diethylene glycol monobutyl ether.
(3) Melamine-formaldehyde resins—same as Example 1.
(4) Ammonium polyphosphate—same as Example 1.
(5) Polyvinyl acetate emulsion—same as Example 1.
(6) Antifoam agent—same as Example 1.

The above composition is prepared in the same manner as the composition of Example 1.

EXAMPLE III

| Additive: | Parts by weight |
|---|---|
| Water | 31.0 |
| Wetting agent | 0.5 |
| Titanium dioxide | 8.0 |
| Solvent plasticizer | 2.0 |
| Ammonium polyphosphate | 24.0 |
| Dicyandiamide | 8.0 |
| Dipentaerythritol | 4.0 |
| Chlorinated paraffins (about 70% chlorine by weight) | 5.0 |
| Polyvinyl acetate-containing emulsion (about 55% solids) | 16.0 |
| Carboxymethylcellulose | 0.5 |

*Note:*

(1) Solvent plasticizer—either: (a) diethylene glycol diethyl ether; (b) ethylene glycol monoethyl ether acetate; (c) mixtures of (a) and b).
(2) Ammonium polyphosphate—Phosphorus, percent by weight—31.2, solubility—2.0, ammoniacal nitrogen to phosphorus molar ratio—~0.9, crystalline form 2.
(3) Polyvinyl acetate-containing emulsion—"Resyn" 5000—a trademark name for a polyvinyl acetate acrylate copolymer emulsion sold by National Starch and Chemical Company.

For the above formulation, all of the above additives are mixed together in a pebble mill in the above listed order through the chlorinated paraffins and then mixed on a paint shaker for about 1 hour. The remaining additives are then added and again the composition is mixed on a paint shaker but for about 30 minutes.

What is claimed is:

1. An intumescent coating composition comprising an aqueous dispersion of (A) polyvinyl acetate-containing emulsion as a film forming latex binder,
(B) a solvent plasticizer selected from the group comprising alkoxy glycol ether, alkoxy glycol diether and alkoxy glycol mono-ether mono-acetate wherein the etherified glycol contains from about 6 to about 10 carbon atoms, which volatilizes after said composition is applied as a surface coating,
(C) a carbonific, and
(D) a substantially water-insoluble ammonium polyphosphate composition having the following formula

$$H_{(n-m)+2}(NH_4)_m P_n O_{3n+1}$$

wherein $n$ is an integer having an average value greater than 10 and $m/n$ has an average value between about .7 and about 1.1 and the maximum value of $m$ is equal to $n+2$;

with the foregoing comprising from about 30% to about 90% by weight of the total composition.

2. The composition of claim 1, wherein said latex emulsion is in an amount to provide from about 5% to about 40% of latex solids based on the total weight of solids present, said solvent plasticizer selected from the group consisting of alkoxy glycol ethers, alkoxy acetates, and mixtures thereof in amounts to provide from about 0.1% to about 10% based on the weight of latex solids present, said carbonifics are in amounts to provide from about 1% to about 40% based on the total weight of solids and said ammonium polyphosphates are in amounts to provide from about 1% to about 60% based on the total weight of solids present.

3. The composition of claim 2, wherein said carbonific solids are selected from the group consisting of urea-formaldehyde, melamine-formaldehyde, dipentaerythritol, tripentaerythritol, chlorinated paraffins and mixtures thereof.

4. The composition of claim 3, wherein said latex emulsion is selected from the group consisting of polyvinyl acetate emulsion and copolymer of vinyl acetate and acrylate emulsion.

5. The composition of claim 4, wherein said latex emulsion is a polyvinyl acetate emulsion.

6. The composition of claim 5, wherein the integer $n$ of said ammonium polyphosphate has an average value from about 20 to about 400 as determined by the end group titration method.

7. The composition of claim 6, wherein said ammonium polyphosphate is of the crystalline Form I.

8. The composition of claim 5, wherein said latex emulsion is in an amount to provide from about 10% to about 30% latex solids based on the total weight of the solids present, said solvent plasticizer is in an amount to provide from about 1% to about 3% based on the weight of latex solids present, said carbonifics are in amounts to provide from about 10% to about 30% based on the total weight of solids, and said ammonium polyphosphates are in amounts to provide from about 12% to about 30% based on the total weight of solids.

9. The composition of claim 8, wherein the integer $n$ of said ammonium polyphosphate has an average value from about 20 to about 400 as determined by the end group titration method.

10. The composition of claim 9, wherein said ammonium polyphosphate is of crystalline Form I.

References Cited

UNITED STATES PATENTS

| | | | |
|---|---|---|---|
| 2,482,756 | 9/1949 | Ford et al. | 8—116.3 |
| 2,781,281 | 3/1955 | Berger | 117—136 |
| 2,600,455 | 8/1950 | Wilson | 260—6 |
| 2,464,342 | 3/1949 | Pollak. | |
| 2,684,953 | 7/1954 | Stilbert et al. | |
| 2,717,198 | 9/1955 | Jones et al. | 23—106 |

(Other references on following page)

FOREIGN PATENTS 643,281 6/1962 Canada.
643,261 6/1962 Canada.
819,190 9/1959 Great Britain.

MORRIS LIEBMAN, Primary Examiner

S. L. FOX, Assistant Examiner

U.S. Cl. X.R.

260—17.4, 28.5, 29.6, 851; 106—15; 252—8.1

PO-1050
(5/69)

UNITED STATES PATENT OFFICE
CERTIFICATE OF CORRECTION

Patent No. 3,513,114          Dated May 19, 1970

Inventor(s) Frank J. Hahn and Howard L. Vandersall

It is certified that error appears in the above-identified patent and that said Letters Patent are hereby corrected as shown below:

In column 2, line 58, the formula was incorrectly printed and should read -- $H_{(n-m)+2}H_{n-m}(NH_4)_m P_n O_{3n+1}$ --.

In column 4, line 8, after the date "Dec. 22, 1964" the following words should be inserted before the period --now U.S. Patent No. 3,397,035.--; line 60, the word "Amound" should read --Amount--.

Signed and sealed this 30th day of May 1972.

(SEAL)
Attest:

EDWARD M.FLETCHER,JR.          ROBERT GOTTSCHALK
Attesting Officer                  Commissioner of Patents